US 6,541,542 B2
Apr. 1, 2003

(12) United States Patent
Yuan et al.

(10) Patent No.: US 6,541,542 B2
(45) Date of Patent: Apr. 1, 2003

(54) PROCESS FOR PRODUCTION OF POLYMERIC POWDERS

(75) Inventors: Jinghua Yuan, Kingsport, TN (US); Stephen Hong-Wei Wu, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/843,114

(22) Filed: Apr. 25, 2001

(65) Prior Publication Data

US 2002/0042457 A1 Apr. 11, 2002

Related U.S. Application Data

(60) Provisional application No. 60/236,545, filed on Sep. 29, 2000.

(51) Int. Cl.⁷ .................................................. C08K 7/11
(52) U.S. Cl. ....................................... 523/223; 523/319
(58) Field of Search .................................. 523/223, 319

(56) References Cited

U.S. PATENT DOCUMENTS

| 4,177,177 | A | 12/1979 | Vanderhoff et al. |
| 4,330,338 | A | 5/1982 | Banker |
| 4,960,814 | A | 10/1990 | Wu et al. |
| 5,025,004 | A | 6/1991 | Wu et al. |
| 6,177,103 | B1 * | 1/2001 | Pace .......................... 424/489 |

FOREIGN PATENT DOCUMENTS

WO    WO 99/20098    4/1999

* cited by examiner

*Primary Examiner*—Edward J. Cain
(74) *Attorney, Agent, or Firm*—Michael J. Blake; Bernard J. Graves, Jr.

(57) ABSTRACT

A novel process for preparing polymers having an average particle size of less than about 40 micrometers is described. The process involves dissolving a polymer in a solvent to form a solution that is introduced into an agitating aqueous medium.

11 Claims, No Drawings

PROCESS FOR PRODUCTION OF POLYMERIC POWDERS

CROSS REFERENCE TO RELATED APPLICATION

This application claims the benefit of provisional application Serial No. 60/236,545 filed Sep. 29, 2000.

FIELD OF THE INVENTION

This invention relates to a novel process for the production of polymeric powders having an average particle size of less than about 40 micrometers.

BACKGROUND OF THE INVENTION

Enteric coating polymers are commonly used for tablets and particle coatings in preparing an oral dosage form. Polymers which are commonly used for enteric coating preparation include cellulosic materials such as cellulose acetate phthalate (C-A-P), cellulose acetate trimellate (C-A-T), cellulose acetate succinate (C-A-S), hydroxypropyl methylcellulose phthalate (HPMCP), hydroxypropyl methylcellulose acetate succinate (HPMCAS), copolymers of methacrylic acid and methyl methacrylate or ethyl acrylate, terpolymers of methacrylic acid, methacrylate, and ethyl acrylate, and polyvinyl acetate phthalate (PVAP). Among these polymers, cellulosic polymers are particularly prone to be hydrolyzed in contact with moisture, especially at elevated temperature.

In patent application WO99/20098, it is disclosed that for anti-viral and anti-bacterial purposes, the polymeric material, particularly C-A-P and HPMCP must be in the form of finely dispersed micronized particles of less than approximately 40 micrometers average particle size, dispersed in a water-miscible, non-solvent for the polymer, such as glycerol. In the WO99/20098 application, there was used a product containing from 63–70% micronized C-A-P, and from 30–33% other additives including poloxamer, distilled acetylated monoglycerides, and polysorbate 60. It is well known that poloxamer can cause the C-A-P to become unstable when subjected to heat and high moisture environments.

U.S. Pat. Nos. 4,177,177 and 4,330,338 describe an emulsification process for converting a water-insoluble polymeric material into a latex-like dispersion. It is known as pseudolatex process. In both patents, a combination of surfactant and emulsion stabilizer must be used in order to form a stable latex-like dispersion.

U.S. Pat. Nos. 4,960,814 and 5,025,004 by Wu et al. describe water-dispersible polymeric compositions and a process for preparing the compositions. The process makes stable colloidal latex-like dispersions of enteric coating polymers such as C-A-P and HPMCP, which can be spray dried in air to form water-dispersible powder materials. The process employs a combination of a water-in-oil and an oil-in-water emulsifier.

In the above-mentioned patents, the disclosed compositions comprise a polymer and a combination of at least two surface active materials in order to make stable latex emulsions or water-dispersible powders. The process uses both water-soluble and water-insoluble volatile organic solvents as vehicles in the preparation of an oil-in-water emulsion containing polymers, and then the organic solvent(s) is removed to yield a latex-like dispersion. The need for removing organic solvents in the process is very costly and undesirable. The dispersion is then spray-dried to form a water-dispersible powder product.

Therefore, it would be desirable to have a polymeric powder of less than about 40 micrometers average particle size, produced in the absence of necessarily introducing undesirable surfactants or other additives.

SUMMARY OF THE INVENTION

The novel process according to the present invention for the production of polymeric powders having an average particle size of about less than 40 micrometers, is comprised as follows. A solution of a suitable polymer that is soluble in polyethylene glycol, glycofurol, or propylene carbonate, is prepared, and the resulting solution is introduced into an aqueous medium which is under agitation such that there is produced a discrete droplet of polymer/solvent in aqueous medium. The solvent is removed and the polymer powder having an average particle size of less than about 40 micrometers is recovered. Preferably, the polymer powders have an average particle size of from about less than 1 to about 20 micrometers.

DETAILED DESCRIPTION OF THE INVENTION

Polymer powders having an average particle size of less than about 40 micrometers, are useful in many applications such as antiviral, antimicrobial, for enteric coatings, for making tablets by direct compression, for granulating with medicaments to form particles, for adhesion in connection with topically applied medicaments, and the like.

The novel process according to the present invention for producing the polymer powder having an average particle size of less than about 40 micrometers, comprises:

(a) forming a solution of polymer in polyethylene glycol, or glycolfurol or propylene carbonate, or mixtures thereof, and (b) introducing the resultant polymer-containing solution into an aqueous medium that is being agitated sufficiently such that there is produced a dispersion of discrete droplets of the polymer in the aqueous medium, the polymer having an average particle size of less than about 40 micrometers. As noted above, the polymer powder preferably has an average particle size of from about less than 1 to about 20 micrometers.

The polymer powder having an average particle size of less than about 40 micrometers can be recovered in any conventional manner. The following is the method(s) by which recovery of the polymer powder was achieved in the present application, starting with the dispersion of discrete polymer particles having an average particle size of less than about 40 micrometers, as obtained in step (b) above.

(c) the resulting dispersion of step (b) is allowed to stand without agitation until two distinct separate layers are formed, a white, cloudy upper layer, and a clear aqueous layer at the bottom.

(d) the two layers are separated by any means known in the art, such as, for example, by means of a separatory funnel, decantation, or the like, and the white cloudy upper layer containing the polymer is treated, as by centrifugation at approximately 1750 rpm (revolutions per minute), to remove aqueous solution from the dispersed particles, as a result of which treatment, as much as possible of unreacted polyethylene glycol or glycofurol or propylene carbonate, or mixtures thereof, and water, are removed, (e) the resulting settled solid polymer is then washed with water and centrifuged, preferably three times, to remove excess polyethylene glycol, glycofurol or propylene carbonate, and to thereby yield a polymeric material, (f) the polymeric material can be dried to remove water and thereby yield a fluffy polymer powder.

In an alternative embodiment, the polymeric material of step (e) can be mixed with an organic liquid that will prevent the particles from agglomerating. Any organic liquid may be used for this purpose, including, for example, glycerol, silicone oil, any oil, and the like. The resultant product, that may have a cream-like texture, may be used for many applications in this form.

The polymer(s) suitable for use in the present invention is any polymer(s), or mixtures thereof, that is water-insoluble, and is soluble in a solvent selected from polyethylene glycol having a weight average molecular weight of from about 200 to about 600, preferably from about 200 to about 450, or glycofurol, or propylene carbonate, or mixtures of the solvents. Exemplary of the suitable polymers are cellulose acetate phthalate (C-A-P), hydroxypropyl methylcellulose phthalate (HPMCP), cellulose acetate trimellitate (C-A-T), cellulose acetate succinate (C-A-S), hydroxypropyl methylcellulose acetate succinate (HPMCAS), cellulose acetate, cellulose butyrate, ethyl cellulose, polyvinyl acetate phthalate (PVAP), carboxymethylcellulose, carboxyvinyl polymer, and the like. Preferred for use are cellulose acetate phthalate (C-A-P) and hydroxypropyl methylcellulose phthalate (HPMCP).

The solvents in which the polymers of the present invention must be soluble are polyethylene glycol having a weight average molecular weight of from about 200 to about 600, preferably from about 200 to about 450, or glycofurol or propylene carbonate. The preferred solvent for use herein is polyethylene glycol having a weight average molecular weight of from about 200 to about 600.

In preparing the solution of polymer in the solvent selected from the polyethylene glycol having a weight average molecular weight of about 200 to about 600, or glycofurol or propylene carbonate, it is preferred that the solution comprise from about 5 to about 15%, preferably from about 5 to about 10% (percent) of polymer by weight. It is further desirable that the polymer-containing solution have a viscosity of about 500 to about 5000 cp at a selected temperature below the boiling temperature of water, that is below 100° C.

The polyethylene glycol, glycofurol or propylene carbonate solvents herein may be used individually or in any combination or mixture thereof. Furthermore, the previously described solvent may be used optionally and preferably with water or a volatile organic solvent that is miscible with the polyethylene glycol, or glycofurol or propylene carbonate, or mixtures of water and solvent, as a solvent for the polymer. Exemplary of volatile organic solvents that are miscible with the polyethylene glycol, glycofurol or propylene carbonate, are acetone, ethanol, n-propanol, isopropanol, ethyl acetate, methyl ethyl ketone, methylene chloride, and the like. When utilized in this manner, the solvent selected from polyethylene glycol having a weight average molecular weight of about 200 to about 600, glycofurol or propylene glycol is present in a ratio to that of the water, volatile organic solvent, or mixture thereof, of from about greater than 3.2:1, preferably from about greater than about 4:1. Preferred for use herein with the solvent is water, acetone, or a mixture thereof.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples, the average particle size of the polymers produced by the present novel process, as well as the average particle size of the polymer dispersed in glycerol, where determined, were obtained by using a MICROTRAC Model Number UPA150 particle analyzer produced by Honeywell of Phoenix, Ariz.

Also, in carrying out the examples herein, the apparatus included a glass jar vessel having a diameter of 10 cm (centimeters) and a height of 17 cm. The vessel was equipped with a high shearing mechanical homogenizer that generates high shearing, mixing, and agitation, in an aqueous medium. In the examples of the present invention, the homogenizer used was ULTRA-TURRAX Model Number T50 produced by JANKE & KUNKEL Company, of Germany. The head of the stirring device was placed about 3 cm. above the bottom of the vessel, and the homogenizer was rotating at a rate of about 6000 rpm. It is possible to utilize any mechanical device known in the art to generate high shearing, mixing, and agitation, in an aqueous medium.

Example 1

In the example, there is provided a process for preparing cellulose acetate phthalate (C-A-P) having an average particle size of less than about 40 micrometers. Using the previously described apparatus, 200 grams of water were added to the vessel, and the water was agitated vigorously using the homogenizer rotating at about 6000 rpm. Into the agitating water there was introduced a solution of C-A-P containing 8.5 grams of C-A-P, 76.5 grams of PEG having a weight average molecular weight of 400, and 15 grams of water. The solution was introduced at a rate of about 1 mL/min (milliliter/minute). When the C-A-P solution was added to the agitating water, there was formed a cloudy dispersion comprising discrete droplets of the C-A-P polymer in the aqueous medium. The average particle size of the C-A-P was determined as set forth above using the MICROTAC particle analyzer. As noted, the average particle size distribution of the C-A-P was as follows:

| Percent Relative Volume | Particle Size (micrometers) |
| --- | --- |
| 10 | 1.2 |
| 50 | 4.5 |
| 90 | 18.5 |

To recover the C-A-P polymer, the cloudy dispersion was allowed to stand with no agitation. There were formed a white cloudy upper layer and a clear layer at the bottom. The cloudy upper layer was separated from the bottom layer using a separatory funnel, and then the cloudy upper layer containing the polymer particles was centrifuged at 1750 rpm. The resultant settled polymer mass was then washed with water and centrifuged. The washing and centrifugation was repeated three times to remove excess polyethylene glycol. There was obtained a C-A-P concentrated solid mass, that was dried to yield a fluffy powder.

A portion of the C-A-P that had been washed and centrifuged three times to remove the excess polyethylene glycol, and was in the form of a C-A-P concentrated solid mass, was mixed with glycerol to form a cream-like texture. Utilizing the MICROTAC particle analyzer as described above, the average particle size distributions of the C-A-P polymer in glycerol were obtained as follows:

| Percent Relative Volume | Particle Size (micrometers) |
|---|---|
| 10 | 4.3 |
| 50 | 15.8 |
| 90 | 42.3 |

Example 2

In this example, there was produced a fine cellulose acetate phthalate (C-A-P) dispersion utilizing as a solvent for the C-A-P polymer, a combination of polyethylene glycol and acetone. More particularly, the process of Example 1 was followed with the exception that the polymer containing solution added to the agitating water comprised a solution containing 8.5 grams of C-A-P, 15 grams of acetone, and 76.5 grams of polyethylene glycol having a weight average molecular weight of 400. The C-A-P produced in this example was observed to have an average particle size of less than 40 micrometers.

Example 3

In this example there was utilized as the polymer, hydroxypropyl methylcellulose phthalate (HPMCP). The process of Example 1 was followed, except for substituting HPMCP polymer in place of the C-A-P polymer used therein. As observed, the average particle size of the HPMCP polymer produced by the process was approximately 30 micrometers, or less.

It was noted, in producing the HPMCP of this example that there was formed a thicker layer of foam as compared with producing C-A-P in Example 1, during the processing. It is believed that the presence of a few large particles of HPMCP resulted from trapping of HPMCP droplets in the foam layer.

It should be clearly understood that the forms of the invention herein described are illustrative only and are not intended to limit the scope of the invention. The present invention includes all modifications falling within the scope of the following claims.

We claim:

1. A process for preparing polymers having an average particle size of less than about 40 micrometers comprising:
   (a) forming a solution of a water-insoluble polymer in a first solvent selected from the group consisting of a polyethylene glycol having a weight average molecular weight of from about 200 to about 600, glycofurol, propylene carbonate, and mixtures thereof, and
   (b) introducing the solution into an aqueous medium that is being agitated sufficiently such that a dispersion of discrete droplets of the polymer in the aqueous medium is produced, wherein the polymer has an average particle size of less than about 40 micrometers.

2. The process according to claim 1 further comprising:
   (c) allowing the dispersion of discrete droplets of polymer in the aqueous medium obtained in claim 1(*b*) to separate into an upper layer and a bottom layer,
   (d) separating the upper layer from the bottom layer,
   (e) removing aqueous solution from the dispersed particles of the upper layer containing polymer, and
   (f) recovering the polymer.

3. The process according to claim 1 further comprising:
   (c) allowing the dispersion of discrete droplets of polymer in the aqueous medium obtained in claim 1(*b*) to separate into an upper layer and a bottom layer,
   (d) separating the upper layer from the bottom layer,
   (e) removing aqueous solution from the dispersed particles of the upper layer containing polymer, and
   (f) mixing the dispersed particles of polymer with an organic liquid such that agglomeration of the particles of polymer is prevented.

4. The process according to claim 1 wherein the first solvent further comprises a component selected from the group consisting of water, a volatile organic second solvent that is miscible with the first solvent, and mixtures thereof, and the first solvent is present in a ratio to the component of about greater than 3.2:1.

5. The process according to claim 4 wherein the volatile organic second solvent is acetone.

6. The process according to claim 1 wherein the solution comprises from about 5 to about 15 percent by weight of polymer.

7. The process according to claim 6 wherein the solution comprises from about 5 to about 10 percent by weight of polymer.

8. The process according to claim 4 wherein the polymer is cellulose acetate phthalate and the first solvent comprises a polyethylene glycol having a weight average molecular weight of about 200 to about 600 and water.

9. The process according to claim 4 wherein the polymer is cellulose acetate phthalate and the first solvent comprises a polyethylene glycol having a weight average molecular weight of about 200 to about 600 and acetone.

10. The process according to claim 4 wherein the polymer is hydroxypropyl methylcellulose phthalate.

11. The process according to claim 1 wherein the average particle size is from about less than 1 to about 20 micrometers.

* * * * *